US012641369B2

(12) United States Patent
Zhi et al.

(10) Patent No.: US 12,641,369 B2
(45) Date of Patent: May 26, 2026

(54) WIRELESS EARPHONES AND CONTROL METHOD THEREOF, COMPUTER EQUIPMENT AND STORAGE MEDIUM

(71) Applicant: SAMSUNG ELECTRONICS CO., LTD., Suwon-si (KR)

(72) Inventors: Yajun Zhi, Xi'An (CN); Dong Xu, Xi'An (CN); Shaoying Zhao, Xi'An (CN); Fei Wang, Xi'An (CN); Kun Wang, Xi'An (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 18/519,857

(22) Filed: Nov. 27, 2023

(65) Prior Publication Data

US 2025/0039604 A1 Jan. 30, 2025

(30) Foreign Application Priority Data

Jul. 24, 2023 (CN) ........................ 202310912212.6

(51) Int. Cl.
*H04R 3/12* (2006.01)
*H04R 1/10* (2026.01)

(52) U.S. Cl.
CPC ............. *H04R 3/12* (2013.01); *H04R 1/1016* (2013.01); *H04R 2420/07* (2013.01); *H04R 2430/20* (2013.01)

(58) Field of Classification Search
CPC .... H04R 3/12; H04R 1/1016; H04R 2420/07; H04R 2430/20; H04W 4/80
See application file for complete search history.

(56) References Cited

U.S. PATENT DOCUMENTS 9,191,988 B2 * 11/2015 Newham ............... H04W 12/50
9,325,828 B1 * 4/2016 Oh .................... H04M 1/72454
9,606,952 B2 * 3/2017 Mayman ............. G06F 13/4072
9,866,962 B2 * 1/2018 Boesen ................ H04R 1/1016
10,432,773 B1 10/2019 Tong et al.
10,916,830 B2 2/2021 Muthuswamy et al.
10,917,930 B2 2/2021 Morris et al.
11,259,192 B2 2/2022 Hariharan et al.
(Continued)

FOREIGN PATENT DOCUMENTS

CN 108600897 B 11/2018
WO 2022/135303 A1 6/2022

OTHER PUBLICATIONS

Woo, Tae Hyun et al, Ultra Wide Band Antenna for True Wireless Stereo Earphones, IEEE, pp. 733-734 (Year: 2021).*

*Primary Examiner* — Lewis G West
(74) *Attorney, Agent, or Firm* — Sughrue Mion, PLLC

(57) ABSTRACT

A method for controlling a set of wireless earphones, including: establishing a first Bluetooth (BT) connection between a first earphone of the set of wireless earphones and a source apparatus; based on the source apparatus supporting Ultra Wide Band (UWB) connections: establishing a first UWB connection between the first earphone and the source apparatus, and a second UWB connection between a second earphone of the set of wireless earphones and the source apparatus; and receiving, by the first earphone, audio data from the source apparatus using the first UWB connection, wherein the audio data is received from the source apparatus by the second earphone using the second UWB connection.

20 Claims, 6 Drawing Sheets

(56) References Cited

U.S. PATENT DOCUMENTS

| | | | | |
|---|---|---|---|---|
| 11,375,574 | B2 | 6/2022 | Srivastava et al. | |
| 11,425,485 | B2 * | 8/2022 | Koss | H04R 1/1083 |
| 2003/0083058 | A1 * | 5/2003 | Mayer | H04B 1/3838 455/15 |
| 2003/0232597 | A1 * | 12/2003 | Mayer | H04B 1/3838 455/15 |
| 2007/0054705 | A1 * | 3/2007 | Liow | H04M 1/05 455/572 |
| 2007/0224933 | A1 * | 9/2007 | Mayer | H04B 1/3838 455/84 |
| 2010/0080177 | A1 * | 4/2010 | Rofougaran | H04W 76/15 370/329 |
| 2013/0316649 | A1 * | 11/2013 | Newham | H04W 88/04 455/39 |
| 2018/0217809 | A1 * | 8/2018 | Yu | G06F 3/165 |
| 2019/0104424 | A1 | 4/2019 | Hariharan et al. | |
| 2021/0176811 | A1 | 6/2021 | Sokolov et al. | |
| 2022/0086554 | A1 * | 3/2022 | Lee | H04R 1/1025 |
| 2022/0417689 | A1 * | 12/2022 | Zhao | H04R 5/033 |
| 2023/0006711 | A1 * | 1/2023 | Zhao | H04B 1/7163 |
| 2023/0018784 | A1 * | 1/2023 | Lee | H04W 4/80 |
| 2025/0106908 | A1 * | 3/2025 | Perraud | H04W 4/80 |
| 2025/0189649 | A1 * | 6/2025 | Koo | G01S 13/0209 |

* cited by examiner

WIRELESS EARPHONES AND CONTROL METHOD THEREOF, COMPUTER EQUIPMENT AND STORAGE MEDIUM

CROSS-REFERENCE TO RELATED APPLICATION(S)

This application is based on and claims priority under 35 U.S.C. § 119 to Chinese Patent Application No. 202310912212.6, filed on Jul. 24, 2023, in the China National Intellectual Property Administration, the disclosure of which is incorporated by reference herein in its entirety.

BACKGROUND

1. Field

The present disclosure relates to a wireless earphone, and more specifically, to wireless earphones and a control method thereof, a computer equipment and a storage medium.

2. Description of Related Art

Bluetooth (BT) technology is widely used in wireless earphone technology. Although BT technology may be used to establish a wireless link between a master earphone and a slave earphone in wireless earphones, to save power consumption and resource overhead while simplifying a software design of earphones, an evolution of BT technology may be slow, and wireless earphones using BT may be unable to meet a user's demand for transmission of data having a lossless high fidelity sound quality.

SUMMARY

Provided are wireless earphones and control method thereof, a computer equipment and a storage medium.

Additional aspects will be set forth in part in the description which follows and, in part, will be apparent from the description, or may be learned by practice of the presented embodiments.

In accordance with an aspect of the disclosure, a method for controlling a set of wireless earphones includes: establishing a first Bluetooth (BT) connection between a first earphone of the set of wireless earphones and a source apparatus: based on the source apparatus supporting Ultra Wide Band (UWB) connections: establishing a first UWB connection between the first earphone and the source apparatus, and a second UWB connection between a second earphone of the set of wireless earphones and the source apparatus; and receiving, by the first earphone, audio data from the source apparatus using the first UWB connection, wherein the audio data is received from the source apparatus by the second earphone using the second UWB connection.

In accordance with an aspect of the disclosure, a wireless earphone system includes a first earphone configured to: establish a first Bluetooth (BT) connection with a source apparatus, based on the source apparatus supporting Ultra Wide Band (UWB) connections: establish a first UWB connection with the source apparatus, and receive audio data from the source apparatus using the first UWB connection; and a second earphone configured to: based on the source apparatus supporting the UWB connections: establish a second UWB connection with the source apparatus, and receive the audio data from the source apparatus using the second UWB connection.

In accordance with an aspect of the disclosure, an apparatus for controlling a set of wireless earphones includes: at least one memory storing instructions; and at least one processor configured to execute the instructions to: establish a first Bluetooth (BT) connection between a first earphone of the set of wireless earphones and a source apparatus; based on the source apparatus supporting Ultra Wide Band (UWB) connections: establish a first UWB connection between the first earphone and the source apparatus, and a second UWB connection between a second earphone of the set of wireless earphones and the source apparatus; and receive, by the first earphone, audio data from the source apparatus using the first UWB connection, wherein the audio data is received from the source apparatus by the second earphone using the second UWB connection.

In accordance with an aspect of the disclosure, a non-transitory computer-readable storage medium stores instructions which, when executed by at least one processor, cause the at least one processor to: establish a first Bluetooth (BT) connection between a first earphone of a set of wireless earphones and a source apparatus: based on the source apparatus supporting Ultra Wide Band (UWB) connections: establish a first UWB connection between the first earphone and the source apparatus, and a second UWB connection between a second earphone of the set of wireless earphones and the source apparatus; and receive, by the first earphone, audio data from the source apparatus using the first UWB connection, wherein the audio data is received from the source apparatus by the second earphone using the second UWB connection.

BRIEF DESCRIPTION OF THE DRAWINGS

The above and other aspects, features and advantages of certain embodiments of the present disclosure will be more apparent from the following description in conjunction with the accompanying drawings, in which.

DETAILED DESCRIPTION

In order to enable one of ordinary skill in the art to better understand the disclosure, embodiments of the disclosure are described below in combination with the accompanying drawings.

It should be noted that the terms "first", "second" and the like in the description and claims of the present disclosure and the above drawings are used to distinguish similar objects, and need not be used to describe a specific order or sequence. It should be understood that, data used as such may be interchanged in appropriate cases, so that embodiments of the present disclosure described herein may be implemented in an order other than that illustrated or described herein. The embodiments described below do not represent all embodiments consistent with the present disclosure. On the contrary, they are only examples of devices and methods consistent with some aspects of the present disclosure as detailed in the accompanying claims.

It should be noted here that "at least one of several items" appearing in this disclosure all means that there are three kinds of juxtaposition situations: "any one of these items", "combination of any number of these items", and "all of these items". For example, "including at least one of A and B" includes the following three juxtaposition situations: (1) including A: (2) including B: (3) including A and B. As another example, "performing at least one of steps 1 and 2", may include the following situations: (1) performing step 1: (2) performing step 2; and (3) performing steps 1 and 2.

According to an exemplary embodiment of the present disclosure, the wireless earphones described herein may include various types of wireless earphones, for example, the wireless earphones may be True Wireless Stereo (TWS) earphones, etc., but are not limited thereto.

According to an exemplary embodiment of the present disclosure, the source apparatus described herein may include at least one of a smart phone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a mobile medical device, a camera, a wearable device (such as, smart watch, smart bracelet, etc.), etc. but not limited to this.

Figure 1:
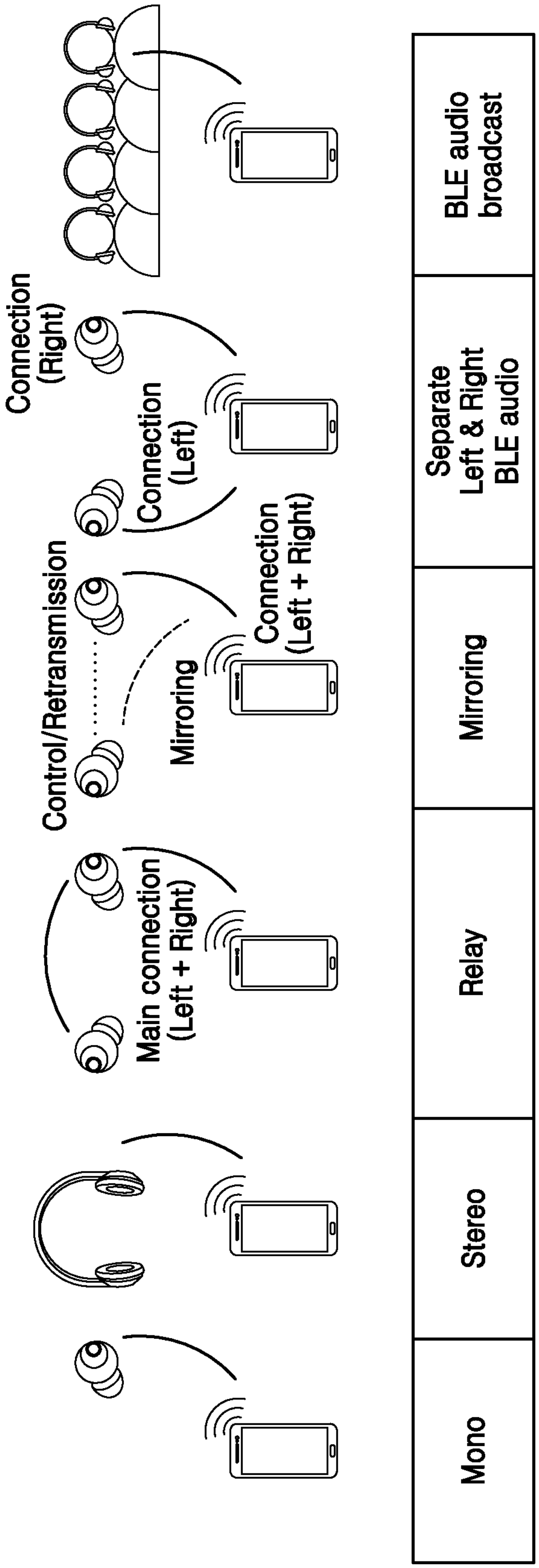
FIG. 1 is a diagram illustrating an evolution of applying of a Bluetooth technology in a control technology of wireless earphones, according to an embodiment.

An evolution of applying a BT technology to wireless earphones in related art is firstly described below. FIG. 1 is a diagram illustrating different modes of applying of a Bluetooth technology in a control technology of wireless earphones. Referring to FIG. 1, the development of control technology of wireless earphones has gone through several stages. In embodiments, audio data transmission modes used in wireless earphones may include a Mono mode, in which a single earphone may be used, a Stereo mode in which a stereo audio signal may be provided to a single device, a Relay mode, and a Mirroring mode.

For example, the Relay mode may refer to a mode in which a BT connection may be established between a master earphone of the wireless earphones and a slave earphone while establishing a BT connection between the master earphone and a source apparatus. The source apparatus may transmit audio data or voice data to the master earphone through the BT connection, the master earphone may relay the audio data to the slave earphone through the BT connection between the master earphone and the slave earphone, and then the master earphone and the slave earphone may play audio based on the audio data which is received through the BT connection. As such, a control method of wireless earphones in the Relay mode may establish a plurality of BT links and may use multi-data transmission between the master earphone and the slave earphone. This may increase signal interference between the BT links, and a system delay caused by data relay may also reduce the a data transmission efficiency. In addition, a power consumption of the master earphone may be higher than a power consumption of the slave earphone due to different operations of the master earphone and slave earphone, which may lead to unbalanced power consumption of the master earphone and the slave earphone, and a premature power depletion of the master earphone.

The Mirroring mode (which may also be referred to as a Snoopy mode) may refer to a mode in which the BT connection is established between the master earphone and the slave earphone while establishing the BT connection between the master earphone and the source apparatus. The master earphone may then transmit BT link information of the BT connection between the master earphone and the source apparatus, to the slave earphone. The source apparatus may transmit the audio data or voice data to the master earphone through the BT connection, and the slave earphone, based on the received BT link information, may listen to audio data transmission of the BT connection between the master earphone and the source apparatus and receive the audio data. Then, the master earphone and the slave earphone may play the audio based on the received audio data. In order to avoid data errors or data loss during listening by the slave earphone, the master earphone may control synchronization of the slave earphone by the BT connection, or retransmit data to the slave earphone through the BT connection. Therefore, the slave earphone in the Mirroring mode may continuously listen to data transmission between the master earphone and the source apparatus. Although this may reduce an amount of data transmitted between the master earphone and slave earphone, the Mirroring mode may still include to establishing the BT link of the BT connection between the master earphone and slave earphone to retransmit and synchronize messages, and the plurality of BT links may still increase the signal interference between the BT links and reduce the data transmission efficiency.

It can be seen that there are still some defects in some control modes of wireless earphones. In addition, as a mainstream data transmission technology for wireless earphones, BT technology may include implementation of Low Energy Audio (LE Audio) series of standards, which may assist in avoiding the establishment of the BT links between the master earphone and the slave earphone, saving the power consumption and the resource overhead, and simplifying a software design of the wireless earphone. However, the evolution of some modes related to Bluetooth Low Energy (BLE) technology may take a long time and may not be able to meet a demand for Lossless High Fidelity Sound Quality (LHSQ) data transmission. Specifically, the LHSQ data transmission may use a data transfer rate of 1411 Kbps, and a standard BT technology may not be able to meet the demand in consideration of factors of the BT transmission such as a frame interval time, a frame overhead, link control information, a retransmission schedule, interference, etc.

Therefore, embodiments may relate to wireless earphones and a control method thereof, a computer equipment and a storage medium according to the present disclosure, which may assist in solving at least some of the above-mentioned problems. For example, embodiments may overcome the interference and delay problems caused by the establishment and transmission of the BT connection discussed above, and may also meet the user's demand for the LHSQ data transmission.

Examples of embodiments are described below with reference to FIGS. 2 through 6.

Figure 2:
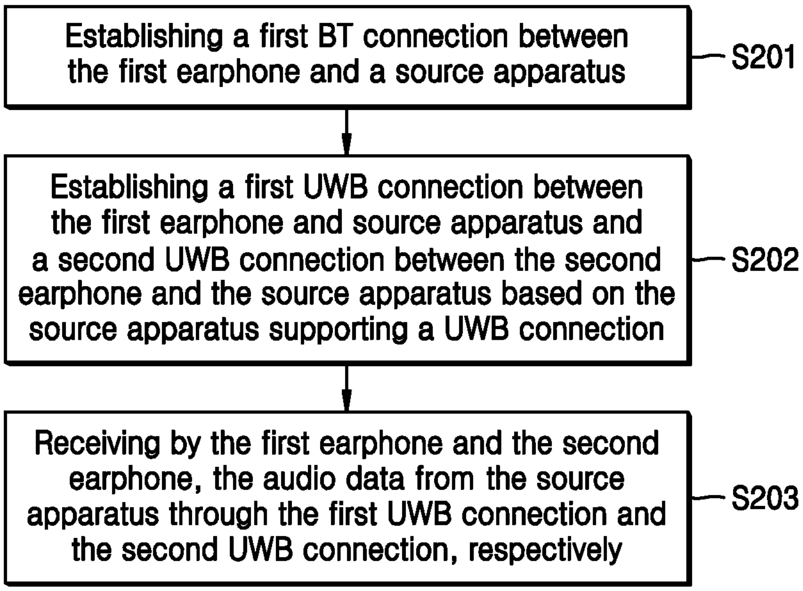
FIG. 2 is a flow chart illustrating a control method of wireless earphones according to an embodiment.

FIG. 2 is a flow chart illustrating a control method of wireless earphones according to an embodiment of the present disclosure. The wireless earphones according to an embodiment of the present disclosure may include a first earphone and a second earphone.

Referring to FIG. 2, at operation S201, a first BT connection may be established between the first earphone and a source apparatus. For example, the first earphone may transmit a BT ADV message to the source apparatus, and the source apparatus may establish the first BT connection with the first earphone based on the received BT ADV message. Here, the BT ADV message may refer to a Bluetooth broadcast message for establishing a BT connection, which may be, for example, a scheduling description message for establishing a BT connection.

The first BT connection may be used to transmit control information related to establishing a UWB connection between the source apparatus and the wireless earphones. In embodiments, a second BT connection may be established between the first earphone and the second earphone, the first earphone may receive control information related to the second UWB connection from the second earphone through the second BT connection, and the first earphone may transmit control information related to a first UWB connection and the control information related to the second UWB connection to the source apparatus through the first BT connection. For example, in order to enable the first earphone and the second earphone to establish the UWB connections with the source apparatus, respectively, the first earphone may transmit the control information related to the first UWB connection of the first earphone to the source apparatus, and the first earphone may relate the control information related to the second UWB connection of the second earphone to the source apparatus. Here, the control information related to the first UWB connection and/or the control information related to the second UWB connection may include a scheduling description message for establishing the UWB connection.

At operation S202, the first UWB connection may be established between the first earphone and the source apparatus and the second UWB connection may be established between the second earphone and the source apparatus based on the source apparatus supporting a UWB connection. For example, if the source apparatus supports the UWB connection, the source apparatus may establish the UWB connections with the first earphone and the second earphone, respectively, to transmit lossless and uncompressed audio data through the UWB connections.

At operation S203, the first earphone may receive the audio data from the source apparatus through the first UWB connection, and the second earphone may receive the audio data from the source apparatus through the second UWB connection. For example, the first earphone and the second earphone may receive the audio data in a UWB frame format directly from the source apparatus through the respective UWB connections, thereby enabling high-speed audio data transmission.

As such, the audio data may be transmitted quickly and losslessly through a UWB transmission technology with high-speed data transmission (e.g., up to 20 megabits per second (Mbit/s)) and low power consumption, and such high-speed transmission can ensures transmission of lossless high fidelity sound quality data. For example, for a source apparatus and wireless earphones which support UWB, a Profile connection at a Host layer may be established through a BT link, and the uncompressed audio data may be transmitted through the UWB link, thus completely eliminating a loss of sound quality caused by audio compression.

In embodiments, based on the transmission of the audio data being completed through the first UWB connection and the second UWB connection, the first earphone may disconnect the first BT connection, the first earphone may transmit information indicating the completion of the transmission of the audio data to the second earphone through the second BT connection, and the first earphone and the second earphone may disconnect the UWB connections with the source apparatus, respectively. For example, when all transmission of the audio data are completed, the first earphone may disconnect the first BT connection and the first UWB connection in response to the completion of the transmission, and instruct or request the second earphone to disconnect the second UWB connection, thereby reducing energy consumption.

An example of a control method of the wireless earphones in the case where the source apparatus supports the UWB connection is described in detail below with reference to FIG. 3.

Figure 3:
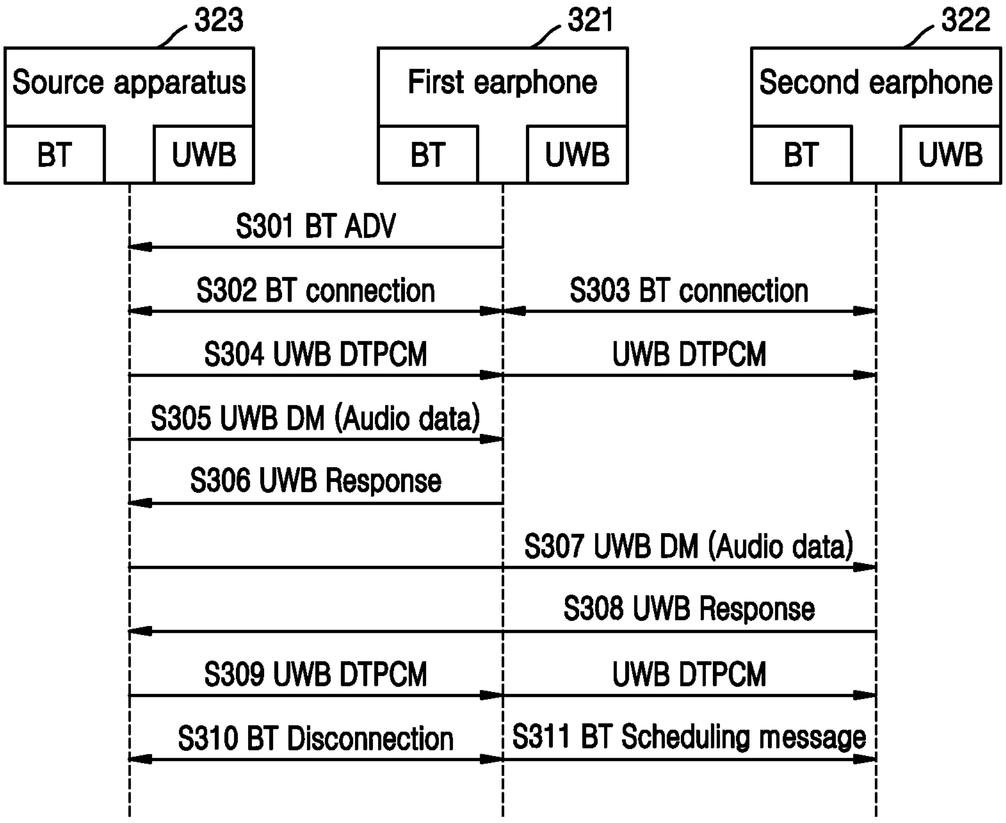
FIG. 3 is a schematic diagram illustrating a first example of a control method of wireless earphones according to an embodiment.

FIG. 3 is a schematic diagram illustrating a first example of a control method of wireless earphones according to an embodiment of the present disclosure. In a first example below, although a first earphone 321 is illustrated as establishing a BT connection with a source apparatus 323 and acting as the master earphone, embodiments are not limited thereto, and the second earphone 322 may also perform the corresponding operation.

Referring to FIG. 3, at operation S301, the first earphone 321 may transmit a BT ADV message to the source apparatus 323 to establish the BT connection. Here, the BT ADV message may refer to a Bluetooth broadcast message for establishing the BT connection, which may be, for example, a scheduling description message.

At operation S302, the first earphone 321 may establish the BT connection with the source apparatus 323.

At operation S303, the first earphone 321 may establish a BT connection with the second earphone 322.

Although the operation S303 is shown to be performed after the operation S302, the operation S302 and the operation S303 may also be performed simultaneously, or the operation S303 may also be performed before the operation S302.

Using the BT connection established at the operation S303, the second earphone 322 may transmit control information related to a UWB connection of the second earphone 322 to the first earphone 321.

Using the BT connection established at the operation S302, the first earphone 321 transmits control information related to a UWB connection of the first earphone 321 and the control information related to the UWB connection of the second earphone 322 to the source apparatus 323, such that the source apparatus 323 obtains the control information related to an establishment of the UWB connection of the first earphone 321 and the control information related to an establishment of the UWB connection of the second earphone 322. In embodiments, the control information related to the establishment of the UWB connection of the first earphone 321 and/or the control information related to the UWB connection of the second earphone 322 may be a scheduling description message of the first earphone 321 and/or the second earphone 322 for establishing the UWB connection. Here, operations S301 to S303 may correspond to the operation S201 of FIG. 2.

Through the operations S301 to S303, the source apparatus 323 may obtain the control information related to the establishment of the UWB connection of the first earphone 321 and the control information related to the establishment of the UWB connection of the second earphone 322. At operation S304, the source apparatus may transmit a UWB Data Transfer Phase Control Message (DTPCM) to the first earphone 321 and the second earphone 322, respectively, to establish UWB connections with the first earphone 321 and the second earphone 322, respectively and to start UWB transmission. Here, the UWB DTPCM may be used to establish the UWB connection and used to indicate a starting of audio data transmission. Here, the operation S304 may correspond to the operation S202 of FIG. 2.

At operation S305, the source apparatus 323 may transmit a UWB Data Message (DM) to the first earphone 321 via the UWB connection. Here, the UWB DM may be audio data in a UWB frame format.

At operation S306, the first earphone 321 may transmit a UWB response message corresponding to the received UWB DM to the source apparatus 323, to acknowledge that the audio data in the UWB DM is received.

Similarly, at operation S307, the source apparatus 323 may transmit the UWB DM to the second earphone 322 via the UWB connection. Here, the UWB DM may be the audio data in the UWB frame format.

Similarly, at operation S308, the second earphone 322 may transmit a UWB response message corresponding to the received UWB DM to the source apparatus 323, to acknowledge that the audio data in the UWB DM is received.

Here, the operations S305 to S308 for performing the audio data transmission may correspond to the operation S203.

When transmission of the audio data is temporarily completed, in other words, when the transmission of the audio data using the UWB connection is not required temporarily, but may resume later, at operation S309, the source apparatus 323 may transmit a UWB DTPCM to the first earphone 321 and the second earphone 322, respectively, to indicate that the current transmission of the audio data is temporarily completed. For example, the source apparatus 323 may transmit the UWB DTPCM command to indicate that a current stage of the audio data transmission is completed, and the first earphone 321 and the second earphone 322 may suspend the UWB transmission but may continue to transmit the audio data through the UWB connection at any time.

When all the transmission of the audio data is completed through the operations S305 to S308, in other words, when the transmission of the audio data is stopped completely, at operation S310, the BT connection between the source apparatus 323 and the first earphone 321 may be disconnected, so that a BT module of the first earphone 321 enters a low energy state. In response to disconnecting the BT connection, the first earphone 321 may stop the UWB transmission, for example, a UWB module of the first earphone 321 may enter the low energy state.

At operation S311, the first earphone 321 may transmit information (e.g., a BT scheduling message) indicating the completion of the audio data transmission to the second earphone 322 to indicate stopping the audio data transmission. The second earphone may disconnect the UWB connection based on the information indicating the completion of the transmission, thereby stopping the UWB transmission. For example, a UWB module of the second earphone 322 may enter a low energy state.

Referring back to FIG. 2, in some embodiments, a source apparatus may not support a UWB connection. Accordingly, a third UWB connection may be established between the first earphone 321 and the second earphone 322 based on the source apparatus 423 not supporting the UWB connection, and the first earphone 321 may transmit the audio data which is received from the source apparatus via the first BT connection, to the second earphone 322 through the third UWB connection. An example of a control method of the wireless earphones in the case where the source apparatus does not support the UWB connection will be described in detail below with reference to FIG. 4.

Figure 4:
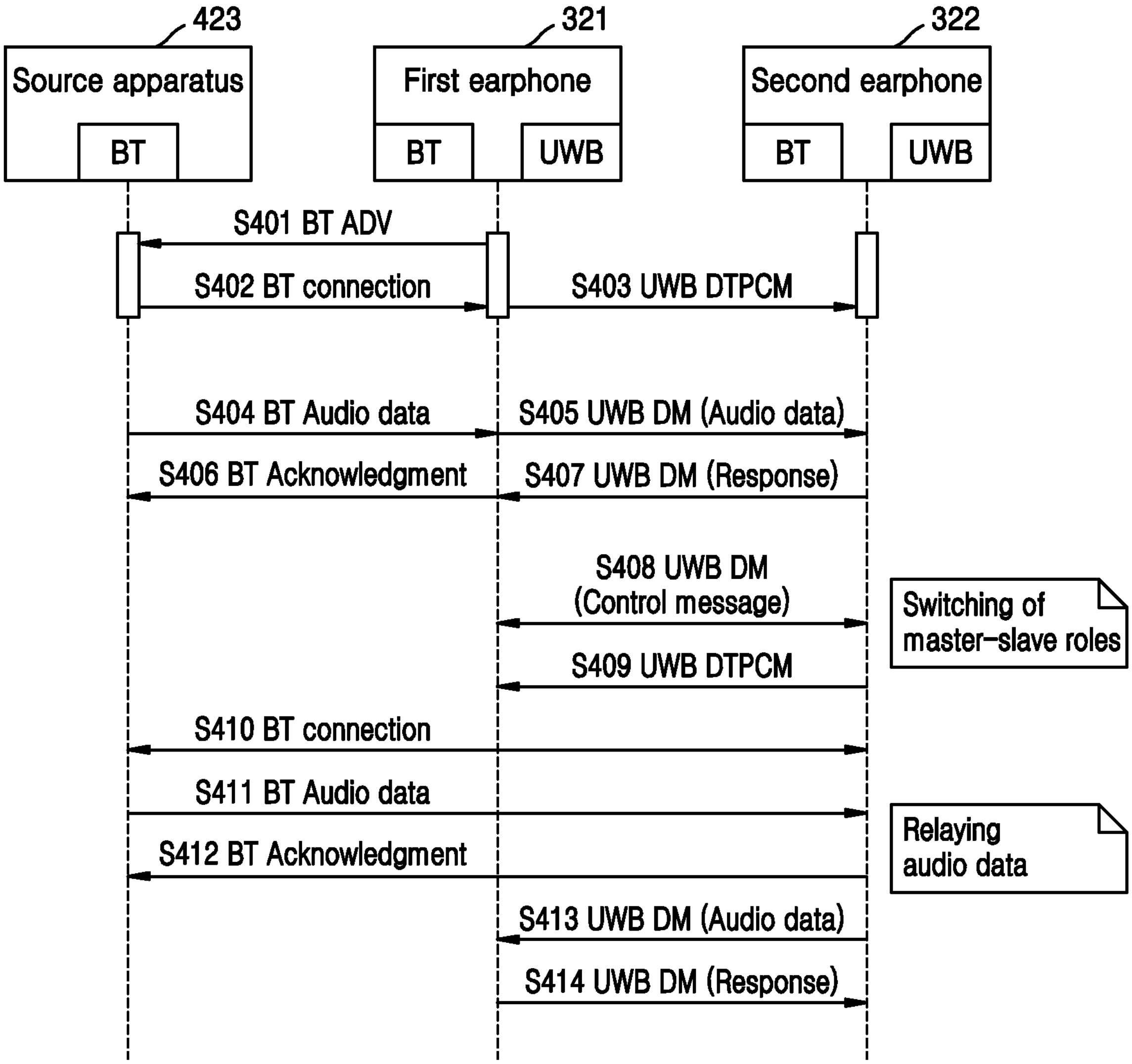
FIG. 4 is a schematic diagram illustrating a second example of a control method of wireless earphones according to an embodiment.

FIG. 4 is a schematic diagram illustrating a second example of a control method of wireless earphones according to an embodiment of the present disclosure.

At operation S401, the first earphone 321 may transmit a BT ADV message to the source apparatus 423 to establish a BT connection. Here, the BT ADV message may refer to a Bluetooth broadcast message for establishing the BT connection, which may be, for example, a scheduling description message.

At operation S402, the first earphone 321 establishes the BT connection with a source apparatus 423.

At operation S403, the first earphone 321 transmits a UWB DTPCM to a second earphone 322 to establish a UWB connection with the second earphone 322 and start UWB transmission. Although the operation S403 is shown to be performed after the operation S402, the operation S402 and the operation S403 may also be performed simultaneously, or the operation S403 may also be performed before the operation S402.

At operation S404, via the BT connection at operation S402, the source apparatus 423 may transmit BT audio data to the first earphone 321.

At operation S406, the first earphone 321 may transmit a BT acknowledgement message to the source apparatus based on the received BT audio data.

At operation S405, the first earphone 321 may transmit the received BT audio data to the second earphone 322 using a UWB DM. For example, the first earphone 321 may relay the received BT audio data to the second earphone 322 through the UWB connection. Here, the UWB DM may be audio data in a UWB frame format.

At operation S407, the second earphone 322 may transmit a UWB DM response message to the first earphone 321 based on the received UWB DM to acknowledge that the audio data in the UWB DM is received.

Through such a relay manner of the UWB connection, a loss of audio data quality caused by the BT transmission between the first earphone 321 and the second earphone 322 may be avoided, and the audio data which is received by the second earphone 322 may be ensured to be the same lossless audio data as that of the first earphone 321, and the high-speed data transmission between the first earphone 321 and the second earphone 322 may be ensured to improve synchronization between the earphones.

In the example corresponding to FIG. 4, although it is illustrated that the first earphone 321 establishes a BT connection with a source apparatus 423 and acts as the master earphone, embodiments are not limited thereto, and the second earphone 322 may also perform the corresponding operation. In addition, the first earphone 321 and the second earphone 322 may also switch between master-slave earphone roles during the operation.

In embodiments, switching control information may be transmitted from the first earphone 321 to the second earphone 322 through the third UWB connection in response to occurrence of a predetermined event, a third BT connection may be established between the second earphone 322 and the source apparatus 423 based on the switching control information, the second earphone 322 may transmit the audio data which is received from the source apparatus 423 via the third BT connection, to the first earphone 321 through the third UWB connection. For example, when the predetermined event occurs, the master-slave earphone roles of the first earphone 321 used as the master earphone and the second earphone 322 used as the slave earphone may be exchanged. By the switching of the master-slave earphone roles, the first earphone 321 may perform the previous operations of the second earphone 322, and the second earphone 322 may perform the previous operation of the first earphone 321.

In embodiments, the predetermined event may include at least one of a transmission time of the audio data exceeding a predetermined time period, a battery level of the first earphone being lower than a predetermined first threshold, a difference between battery level of the first earphone and a battery level of the second earphone being higher than a predetermined second threshold, a malfunction in the BT module of the first earphone, etc. In this case, the master-slave roles of the first earphone 321 and the second earphone 322 may be switched in order to continue the transmission of the audio data. Here, the first earphone 321 may be used with the second earphone 322 interchangeably.

Referring again to FIG. 4, at operation S408, the first earphone 321 may transmit a UWB DM to the second earphone 322 based on the predetermined event occurring. Here, the UWB DM may include control information indicating the switching of the master-slave earphone roles, control information related to the UWB connection of the first earphone, and/or control information related to the BT connection of the source apparatus.

In embodiments, the second earphone 322 may determine or decide to perform a switching of master-slave earphone based on the received UWB DM.

At operation S409, the second earphone 322 may transmit a UWB DTPCM to the first earphone 321 to establish a UWB connection with the first earphone 321.

At operation S410, the second earphone 322 may establish a BT connection with the source apparatus 423 based on the UWB DM in the operation S408.

At operation S411, via the BT connection at the operation S410, the source apparatus 423 may transmit BT audio data to the second earphone 322.

At operation S412, the second earphone 322 may transmit a BT acknowledgement message to the source apparatus 423 based on the received BT audio data.

In embodiments, the second earphone 322 may determine or decide to perform relay of the audio data based on the received BT audio data. Here, the second earphone 322 may package the BT audio data into audio data in a UWB frame format, for transmission through the UWB connection.

At operation S413, the second earphone may transmit the received BT audio data to the first earphone 321 using the UWB DM. For example, the second earphone 322 may relay the received BT audio data to the first earphone 321 through the UWB connection. Here, the UWB DM may be the audio data in the UWB frame format.

At operation S414, the first earphone 321 may transmit a UWB DM response message to the second earphone 322 based on the received UWB DM to acknowledge that the audio data in the UWB DM is received. In embodiments, by switching the master-slave roles of the first earphone 321 and the second earphone 322, an overloading of the power consumption of the first earphone 321 may be avoided, a balanced power consumption of the first earphone 321 and the second earphone 322 may be ensured, a standby endurance and service life of the wireless earphones may be enhanced, and interruption of the transmission of the audio data may be avoided due to a failure of the first earphone 321, thereby ensuring a continuity of the transmission.

Figure 5:
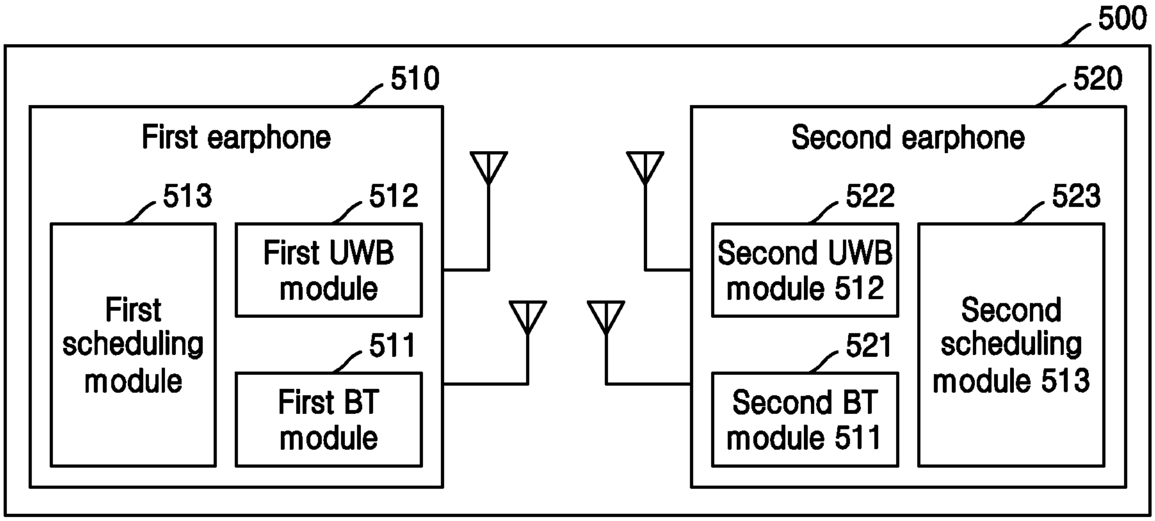
FIG. 5 is a structure block diagram illustrating wireless earphones according to an embodiment.

FIG. 5 is a block diagram illustrating an example of wireless earphones according to an embodiment of the present disclosure.

Referring to FIG. 5, the wireless earphones 500 may include a first earphone 510 and a second earphone 520. In embodiments, the first earphone 510 may correspond to the first earphone 321 discussed above, and the second earphone 520 may correspond to the second earphone 211 discussed above. The first earphone 510 may be configured to: establish a first Bluetooth (BT) connection with a source apparatus, establish a first Ultra Wide Band (UWB) connection with a source apparatus based on the source apparatus supporting a UWB connection, and receive audio data from the source apparatus through the first UWB connection. The second earphone 520 may be configured to: establish a second UWB connection with the source apparatus based on the source apparatus supporting the UWB connection, and receive audio data from the source apparatus through the second UWB connection.

In embodiments, the first earphone 510 may include a first BT module 511, a first UWB module 512, and a first scheduling module 513 configured to: control the first BT module 511 to establish the first BT connection, control the first UWB module 512 to establish the first UWB connection and to receive the audio data from the source apparatus through the first UWB connection. In embodiments, the second earphone 520 may include a second BT module 521, a second UWB module 522 and a second scheduling module 523 configured to: control the second BT module 521 to establish a second BT connection with the first BT module 511, control the second UWB module 522 to establish the second UWB connection and to receive the audio data from the source apparatus through the second UWB connection.

In embodiments, the first scheduling module 513 may be further configured to control the first BT module 511 to: receive control information related to the second UWB connection from the second earphone 520 through the second BT connection; and transmit control information related to the first UWB connection and the control information related to the second UWB connection to the source apparatus through the first BT connection.

In embodiments, based on transmission of the audio data being completed through the first UWB connection and the second UWB connection, the first scheduling module 513 may be further configured to control the first BT module 511 to disconnect the first BT connection, control the first BT module 511 to transmit information indicating the completion of the transmission of the audio data to the second earphone 520 through the second BT connection, control the first UWB module 512 to disconnect the first UWB connection, and the second scheduling module 523 may be further configured to control the second UWB module 522 to disconnect the second UWB connection.

In embodiments, based on the source apparatus not supporting UWB connection, the first scheduling module 513 may be also configured to control the first UWB module 512 to: establish a third UWB connection with the second UWB module 522, transmit the audio data which is received via the first BT connection, to the second earphone 520 through the third UWB connection.

In embodiments, based on an occurrence of a predetermined event, the first scheduling module 513 may be further configured to control the first UWB module 512 to transmit switching control information to the second earphone 520 through the third UWB connection, and the second scheduling module 523 may be further configured to: control the second BT module 521 to establish a third BT connection with the source apparatus based on the switching control information, and control the second UWB module 522 to transmit the audio data which is received from the source apparatus via the third BT connection, to the first earphone 510 through the third UWB connection.

In embodiments, the first earphone 510 may correspond to the first earphone 321 discussed above, and the second earphone 520 may correspond to the second earphone 211 discussed above. Therefore, redundant or duplicative description of the operation thereof may be omitted.

Further, it should be understood that the respective modules in the wireless earphones 500 according to an exemplary embodiment of the present disclosure may be implemented as a hardware and/or software component. Those skilled in the art may, for example, use a field-programmable gate array (FPGA) or an application-specific integrated circuit (ASIC) to implement the respective modules, depending on processing performed by the respective modules as defined.

Figure 6:
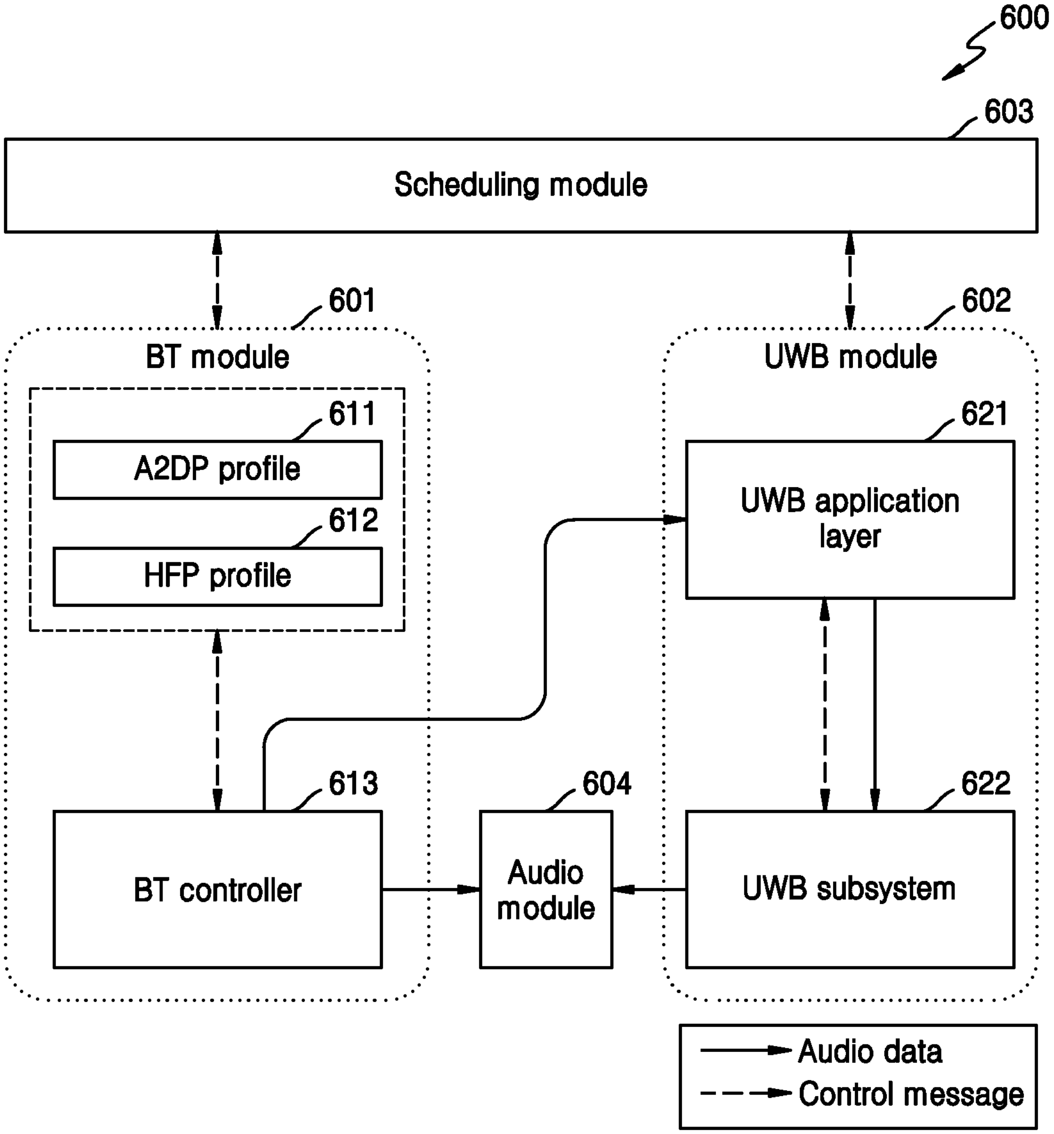
FIG. 6 is a structure block diagram illustrating a first/second earphone included in wireless earphones according to an embodiment.

FIG. 6 is a structure block diagram illustrating an earphone 600 included in wireless earphones according to an embodiment of the present disclosure. In embodiments, the earphone 600 may correspond to any one of first earphone 321, second earphone 322, first earphone 510, second earphone 520, or any other earphones discussed herein.

Referring to FIG. 6, an earphone 600 may be a first earphone or a second earphone. The earphone 600 may include a BT module 601, a UWB module 602, a scheduling module 603, and/or an audio module 604. In embodiments, the BT module 601 may be used to perform functions such as a BT connection, a management of voice and audio services, a BT data transmission, etc. In embodiments, the UWB module 602 is used to perform functions such as a transmission of audio data in a UWB frame format, a data format conversion, etc. In embodiments, the scheduling module 603 may be used to perform functions such as a scheduling of dual links (a BT link and a UWB link), a switching of master-slave earphone roles, data synchronization, an earphone control, etc.

In embodiments, based on the earphone 600 being used as a first earphone, and based on a source apparatus supporting the UWB connection, the BT module 601 may be used only to perform a profile connection control and a management process, for example only to transmit control information related to the UWB connection and not to transmit audio data. In this case, the UWB module 602 may be used for the transmission of the audio data. Accordingly, the earphone 600 may perform the method of the above embodiments in the case where the source apparatus supports the UWB connection in FIGS. 2 and 3. For example, the BT module 601 may establish a BT connection with the source apparatus using a A2DP profile 611 and/or a HFP profile 612 and transmit scheduling description information to the source apparatus through the BT connection, the UWB module 602 may establish a UWB connection with the source apparatus, and a UWB subsystem 622 of the UWB module 602 may receive the audio data in the UWB frame format from the source apparatus and transmit the audio data to the audio module 604 to play the audio data. When transmission of the audio data is completed, the BT module 601 and the UWB module 602 may disconnect corresponding connections and enter a low energy state, respectively.

In embodiments, based the wireless earphone 600 being used as the second earphone, and based on the source apparatus supporting the UWB connection, the UWB module 602 may establish a UWB connection with the source apparatus, and the UWB subsystem 622 of the UWB module 602 may receive the audio data in the UWB frame format from the source apparatus and transmit the audio data to the audio module 604 to play the audio data. When the transmission of the audio data is completed, the UWB module 602 may enter the low energy state.

In embodiments, based on the wireless earphone 600 being used as the first earphone, and based on the source apparatus not supporting the UWB connection, the BT module 601 may be used for the profile connection control and the management process, and may also be used for the transmission of BT audio data. Accordingly, the wireless earphone 600 may perform the method of the above embodiments in the case where the source apparatus does not support the UWB connection in FIGS. 2 and 4. For example, the BT module 601 may establish a BT connection with the source apparatus using the A2DP profile 611 and/or the HFP profile 612, and the BT module 601 may receive BT audio data from the source apparatus through the BT connection and transmit the BT audio data to the audio module 604, to play the audio data through the first earphone. In addition, the UWB module 602 of the earphone 600 may establish a UWB connection with the second earphone, and a BT controller 613 in the BT module 601 may transmit the received BT audio data to the UWB application layer 621 in the UWB module 602, and the UWB application layer 621 may package and encapsulates the BT audio data into the audio data in the UWB frame format and transmits the audio data in the UWB frame format to the UWB subsystem 622, and the UWB subsystem 622 may transmit the audio data in the UWB frame format to the second earphone. When the transmission of the audio data is completed, the BT module 601 and the UWB module 602 may disconnect corresponding connections and enter the low energy state, respectively.

In embodiments, based on the wireless earphone 600 being used as the second earphone, and based on the source apparatus not supporting the UWB connection, the UWB module 602 may establish a UWB connection with the first earphone, and the UWB subsystem 622 of the UWB module 602 may receive audio data from the first earphone and transmit the audio data to the audio module 604 to play the audio data. Based on the transmission of audio data being completed, the UWB module 602 may disconnect the UWB connection and enter the low energy state.

In embodiments, a computer equipment is provided, the computer equipment including: at least one processor; and at least one memory storing computer executable instructions, wherein the computer executable instructions, when being executed by the at least one processor, cause the at least one processor to perform the control method of wireless earphones as described with reference to FIGS. 2 to 4.

In embodiments, the computer equipment may be or include a PC computer, a tablet device, a personal digital assistant, a smartphone, or other devices capable of executing the above set of instructions. Here, the computer equipment does not have to be a single electronic device, but may also be an assembly of any device or circuit that may execute the above instructions (or instruction sets) individually or jointly. The computer equipment may also be a part of an integrated control system or system manager, or may be configured as a portable electronic device that is interfaced with a local or remote (e.g., through wireless transmission).

In embodiments, the processor may run instructions or codes stored in the memory, which may also store data. Instructions and data may also be transmitted and received over the network through a network interface device, which may employ any known transmission protocol.

In embodiments, the memory may be integrated with the processor. For example, a RAM or flash memory may be arranged in an integrated circuit microprocessor or the like. In addition, the memory may include an independent device, such as an external disk drive, storage array, or other storage devices that may be used by any database system. The memory and the processor may be operationally coupled, or may communicate with each other, for example, through an I/O port, a network connection, etc., so that the processor may read files stored in the memory.

A computer-readable storage medium is provided, instructions in the computer-readable storage medium, when being executed by at least one processor, cause the at least one processor to perform the control method of wireless earphones as described with reference to FIGS. 2 to 4.

Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state hard disk (SSD), card memory (such as a multimedia card, secure digital (SD) card, or extreme digital (XD) card), magnetic tape, floppy disk, magneto-optical data storage device, optical data storage device, hard disk, solid state disk, and any other devices configured to store the computer applications and any associated data, data files and data structures in a non-transitory manner, and provide the computer applications and any associated data, data files and data structures to a processor or computer so that the processor or computer can execute the computer applications. The computer applications in the above-mentioned computer readable storage medium can be executed in an environment deployed in a computer device such as a client, a host, a proxy device, a server, etc. in addition, in one example, the computer applications and any associated data, data files and data structures are distributed over networked computer systems so that the computer applications and any associated data, data files and data structures are stored, accessed and executed in a distributed manner by one or more processors or computers.

According to an exemplary embodiment of the disclosure, computer software may be further provided, and instructions in the computer software may be executed by at least one processor to implement the control method of the wireless earphones described in the above exemplary embodiments.

After considering the description and practicing embodiments disclosed herein, those skilled in the art may understand other embodiments of the present disclosure. The present disclosure is intended to cover any variation, use or adaptation of the present disclosure, which follow general principles of the present disclosure and include the common general knowledge or frequently used technical means in the technical field. The description and the embodiments are only regarded as exemplary, and the true scope and spirit of the present disclosure are indicated by the claims.

It should be understood that the present disclosure is not limited to the precise structure described above and shown in the drawings, and various modifications and changes may be made without departing from its scope. The scope of the present disclosure is limited only by the claims.

What is claimed is:

1. A method for controlling a set of wireless earphones, the method comprising:

establishing a first Bluetooth (BT) connection between a first earphone of the set of wireless earphones and a source apparatus;

based on the source apparatus supporting Ultra Wide Band (UWB) connections:

establishing a first UWB connection between the first earphone and the source apparatus, and a second UWB connection between a second earphone of the set of wireless earphones and the source apparatus;

receiving, by the first earphone, audio data from the source apparatus using the first UWB connection, wherein the audio data is received from the source apparatus by the second earphone using the second UWB connection; and relaying, by the first earphone, second control information corresponding to the second UWB connection from the second earphone to the source apparatus using the first BT connection.

2. The method according to claim 1, further comprising:

establishing a second BT connection between the first earphone and the second earphone;

receiving, by the first earphone, the second control information from the second earphone using the second BT connection; and transmitting, by the first earphone, first control information corresponding to the first UWB connection and the second control information using the first BT connection.

3. The method according to claim 1, further comprising:

based on transmission of the audio data being completed using the first UWB connection and the second UWB connection:

disconnecting, by the first earphone, the first BT connection;

transmitting, by the first earphone, completion information indicating the completion of the transmission of the audio data to the second earphone using a second BT connection; and disconnecting, by the first earphone, the first UWB connection, wherein the second earphone disconnects the second UWB connection based on the completion information.

4. The method according to claim 1, further comprising:

based on the source apparatus not supporting the UWB connections:

establishing a third UWB connection between the first earphone and the second earphone;

receiving, by the first earphone, the audio data from the source apparatus through the first BT connection; and transmitting, by the first earphone, the audio data to the second earphone using the third UWB connection.

5. The method according to claim 4, further comprising:

transmitting switching control information from the first earphone to the second earphone using the third UWB connection, based on an occurrence of a predetermined event;

establishing a third BT connection between the second earphone and the source apparatus based on the switching control information; and receiving, by the first earphone through the third UWB connection, new audio data which is received from the source apparatus by the second earphone using the third BT connection.

6. The method according to claim 1, wherein the establishing a first UWB connection between the first earphone and the source apparatus, and a second UWB connection between the second earphone of the set of wireless earphones and the source apparatus comprises:

receiving a UWB Data Transfer Phase Control Message from the source apparatus to the first earphone and the second earphone, respectively; and establishing the first UWB connection and the second UWB connection using the UWB Data Transfer Phase Control Message.

7. The method according to claim 6, wherein the audio data is configured to be in a UWB frame format.

8. A wireless earphone system, comprising:
a first earphone configured to:
establish a first Bluetooth (BT) connection with a source apparatus,
based on the source apparatus supporting Ultra Wide Band (UWB) connections:
establish a first UWB connection with the source apparatus, and
receive audio data from the source apparatus using the first UWB connection; and
a second earphone configured to:
based on the source apparatus supporting the UWB connections:
establish a second UWB connection with the source apparatus, and
receive the audio data from the source apparatus using the second UWB connection,
wherein the first earphone is further configured to relay second control information corresponding to the second UWB connection from the second earphone to the source apparatus using the first BT connection.

9. The wireless earphone system according to claim 8, wherein the first earphone comprises:
a first BT module,
a first UWB module, and
a first scheduling module configured to control the first BT module to establish the first BT connection, and control the first UWB module to establish the first UWB connection and to receive the audio data from the source apparatus using the first UWB connection, and
wherein the second earphone comprises:
a second BT module,
a second UWB module, and
a second scheduling module configured to: control the second BT module to establish a second BT connection with the first BT module, and control the second UWB module to establish the second UWB connection and to receive the audio data from the source apparatus using the second UWB connection.

10. The wireless earphone system according to claim 9, wherein the first scheduling module is further configured to control the first BT module to:
receive the second control information from the second earphone using the second BT connection; and
transmit first control information corresponding to the first UWB connection and the second control information to the source apparatus using the first BT connection.

11. The wireless earphone system according to claim 9, wherein based on transmission of the audio data being completed through the first UWB connection and the second UWB connection, the first scheduling module is further configured to:
control the first BT module to disconnect the first BT connection,
control the first BT module to transmit information indicating the completion of the transmission of the audio data to the second earphone through the second BT connection, and
control the first UWB module to disconnect the first UWB connection, and
wherein based on the transmission of the audio data being completed through the first UWB connection and the second UWB connection, the second scheduling module is further configured to control the second UWB module to disconnect the second UWB connection.

12. The wireless earphone system according to claim 9, wherein based on the source apparatus not supporting the UWB connections, the first scheduling module is further configured to control the first UWB module to:
establish a third UWB connection with the second UWB module; and
transmit the audio data which is received via the first BT connection, to the second earphone through the third UWB connection.

13. The wireless earphone system according to claim 12, wherein based on an occurrence of a predetermined event, the first scheduling module is further configured to control the first UWB module to transmit switching control information to the second earphone using the third UWB connection, and
wherein based on the occurrence of the predetermined event, the second scheduling module is further configured to: control the second BT module to establish a third BT connection with the source apparatus based on the switching control information, and control the second UWB module to transmit the audio data which is received from the source apparatus using the third BT connection, to the first earphone using the third UWB connection.

14. The wireless earphone system according to claim 8, the first earphone is further configured to:
receive a UWB Data Transfer Phase Control Message from the source apparatus and establish the first UWB connection using the UWB Data Transfer Phase Control Message.

15. An apparatus for controlling a set of wireless earphones, the apparatus comprising:
at least one memory storing instructions; and
at least one processor configured to execute the instructions to:
establish a first Bluetooth (BT) connection between a first earphone of the set of wireless earphones and a source apparatus;
based on the source apparatus supporting Ultra Wide Band (UWB) connections:
establish a first UWB connection between the first earphone and the source apparatus, and a second UWB connection between a second earphone of the set of wireless earphones and the source apparatus;
receive, by the first earphone, audio data from the source apparatus using the first UWB connection, wherein the audio data is received from the source apparatus by the second earphone using the second UWB connection; and
relay, by the first earphone, second control information corresponding to the second UWB connection from the second earphone to the source apparatus using the first BT connection.

16. The apparatus according to claim 15, wherein the at least one processor is further configured to execute the instructions to:
establish a second BT connection between the first earphone and the second earphone;

receive, by the first earphone, the second control information from the second earphone using the second BT connection; and transmit, by the first earphone, first control information corresponding to the first UWB connection and the second control information using the first BT connection.

17. The apparatus according to claim 15, wherein the at least one processor is further configured to execute the instructions to:

based on transmission of the audio data being completed using the first UWB connection and the second UWB connection:

disconnect, by the first earphone, the first BT connection;

transmit, by the first earphone, completion information indicating the completion of the transmission of the audio data to the second earphone using a second BT connection; and disconnect, by the first earphone, the first UWB connection, wherein the second earphone disconnects the second UWB connection based on the completion information.

18. The apparatus according to claim 15, wherein the at least one processor is further configured to execute the instructions to:

based on the source apparatus not supporting the UWB connections:

establish a third UWB connection between the first earphone and the second earphone;

receive, by the first earphone, the audio data from the source apparatus through the first BT connection; and transmit, by the first earphone, the audio data to the second earphone using the third UWB connection.

19. The apparatus according to claim 18, wherein the at least one processor is further configured to execute the instructions to:

transmit switching control information from the first earphone to the second earphone using the third UWB connection, based on an occurrence of a predetermined event; and receive, by the first earphone through the third UWB connection, new audio data which is received from the source apparatus by the second earphone using a third BT connection.

20. The apparatus according to claim 15, wherein the at least one processor is further configured to execute the instructions to:

receive a UWB Data Transfer Phase Control Message from the source apparatus to the first earphone and the second earphone, respectively; and establish the first UWB connection and the second UWB connection using the UWB Data Transfer Phase Control Message.

* * * * *